Figure 1:
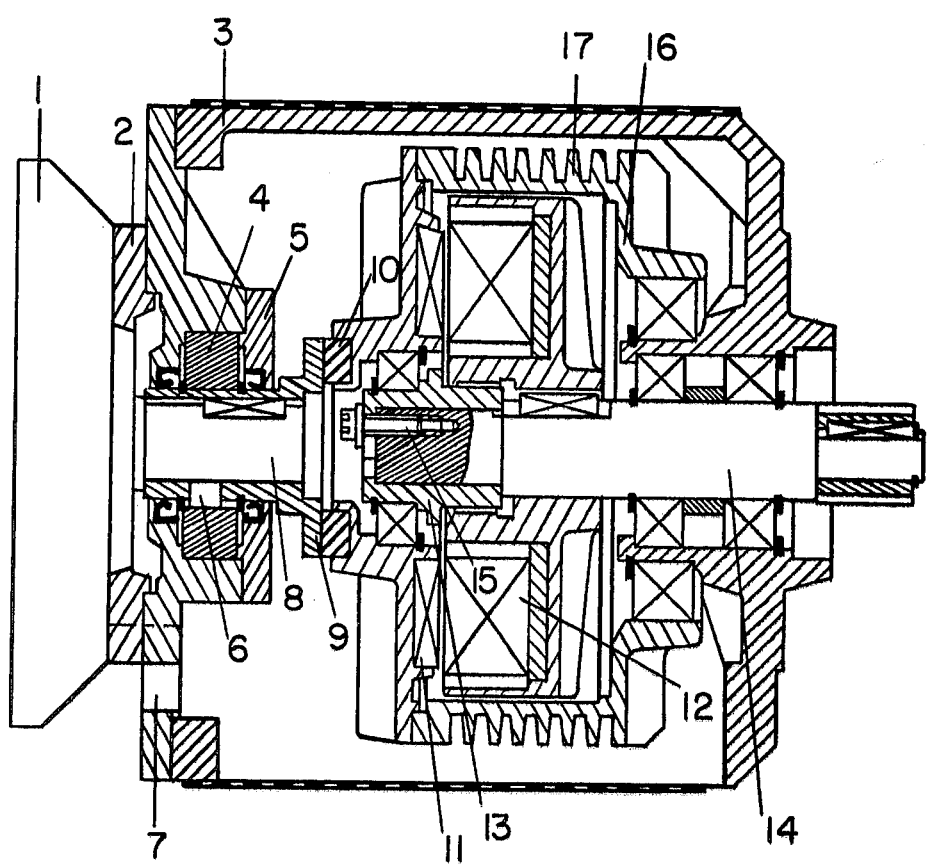

United States Patent [19]

Bérard et al.

[11] 4,103,568

[45] Aug. 1, 1978

[54] MODULAR KINEMATIC CHAIN FOR TRANSMITTING A TORQUE WITH SLIP

[75] Inventors: Michel Bérard; André Lecoustey, both of Belley, France

[73] Assignee: Cefilac, Paris, France

[21] Appl. No.: 746,949

[22] Filed: Dec. 2, 1976

[30] Foreign Application Priority Data

Dec. 18, 1975 [FR] France .................. 75 39640

[51] Int. Cl.² ........................................ F16H 1/28
[52] U.S. Cl. ........................................ 74/801
[58] Field of Search ............ 74/801, 606 R; 310/103, 310/105, 106, 108

[56] References Cited

U.S. PATENT DOCUMENTS

| | | | |
|---|---|---|---|
| 3,700,941 | 10/1972 | Duncan ............................. | 310/105 |
| 3,897,700 | 8/1975 | Haydon ............................. | 74/801 |

FOREIGN PATENT DOCUMENTS 1,518,964  2/1967  France ..................... 310/103

*Primary Examiner*—Samuel Scott
*Assistant Examiner*—Frank H. McKenzie, Jr.
*Attorney, Agent, or Firm*—Dennison, Dennison, Meserole & Pollack

[57] ABSTRACT

A modular kinematic chain for transmitting a torque, with slip and speed reduction, to a member which is rotated. The kinematic chain comprises; at least one motor-coupling group consisting of a standard motor and a hysteresis coupling means with permanent magnets, at least one reducing cell coaxial with the output shaft of the motor-coupling group, and a basic reducing mechanism including a casing containing at least two holes for selectively mounting either a motor-coupling group, possibly associated with a reducing cell, or a closure.

10 Claims, 7 Drawing Figures

MODULAR KINEMATIC CHAIN FOR TRANSMITTING A TORQUE WITH SLIP

The invention relates to a modular kinematic chain for transmitting a torque, with slip and speed reduction, to a member which is rotated, the arrangement allowing for selective use of standardized components.

Many arrangements comprising a kinematic chain are known, enabling the torque produced by any motor to be transmitted, with slip, by way of single or multi-stage reducing systems, to a component which is rotated, e.g. the reel of a winding mechanism. Some examples of the arrangements used are those comprising chain-type reversing means where the torque is supplied by a torque motor, a spring motor, a hydraulic or magnetic motor coupler, etc. or those comprising chain-type or gear-type reducing means, generally with one inlet.

These conventional arrangements have various drawbacks. It is usually necessary to design motors of a special size and class for each particular application, depending on the various work parameters bound up with the rotating components to be controlled, such as its speed or inertia, and it is rarely possible to use standardized components which might be suitable in all cases. Moreover the adjustment of an existing apparatus, intended for a certain task, to a different task is generally disappointing. Since, for economic reasons, it is not always possible to improvise new components, the designer is often reduced to offering existing machines which are oversize as far as performance is concerned but where the cost, and sometimes the space requirement, are out of proportion with the problem to be solved.

Attempts have been made to avoid these drawbacks by resorting partly to multi-purpose elements which would enable standardized components to be used. As far as reducing mechanisms are concerned this is particularly the case of the arrangement described in French Pat. No. 1,518,964. This is a convertible reducing mechanism comprising a casing, which contains an aperture for the passage of an output shaft and several holes for selectively mounting standardized components such as a motor flange, an eccentric cheek carrying a countershaft, or a closure; the output shaft may be driven by one or more motors through one or more reduction stages with toothed pinions.

This arrangement brings a great advance since it allows for selective, modular mounting of standardized components on the reducing mechanism. However, it is only a partial advance and some drawbacks remain.

Modulation of the rotary speed of the output shaft takes place exclusively at the actual reducing mechanism, by the addition of an eccentric cheek carrying a countershaft, which thus makes it possible to add a reduction stage. But one of the inlets, i.e. one of the holes, is necessarily neutralized thereby, for the cheek is mounted at the position allotted to a driving part, thus reducing the number of motors that can be mounted for a casing of a given volume. A reducing mechanism with at least three inlets is therefore required to mount two motors in parallel.

Moreover, even if the reducing mechanism allows for modular assembly, i.e. juxtaposition of a plurality of identical motors, it is still necessary to use special motors which are adapted in their technology to the task required.

Finally, the concentration of the reduction stages inside the casing makes it essential for such machines to receive periodic care and maintenance.

The purpose of the invention is to enable a complete modular kinematic chain to be built up, with slip, comprising a basic reducing mechanism similar in design to that described in French Pat. No. 1,518,964. In this way it must be possible to construct a continuous range of machines of graduated performance, assembled in many different ways, from a small number of standardized components, whatever application may be envisaged. Particularly for energy production standard motors of the customary type should be used in all cases, thus allowing for maximum standardization of the driving part of the chain.

Another purpose of the invention is to allow for optimum utilization of all the inlets of the basic reducing mechanism for a given space requirement, by grouping both a driving and a reducing component at each inlet thereof, and to increase the possibilities of adaptation and adjustment while avoiding the provision of a complex mechanical system, requiring periodic maintenance, inside the casing of the basic reducing mechanism.

According to the invention, a modular kinematic chain for transmitting a torque, with slip and speed reduction, to a member which is rotated comprises:
- at least one motor-coupling group consisting of a standard motor and a hysteresis coupling means with permanent magnets assembled by a flange,
- at least one complementary reducing cell coaxial with the output shaft of a motor-coupling group,
- and a basic convertible reducing mechanism including a casing containing an aperture for the passage of an output shaft and at least two holes for selectively mounting either a motor-coupling group, possibly associated with a complementary reducing cell, or a closure; the output shaft of the reducing mechanism being driven selectively by at least one output shaft of a motor-coupling group or of a complementary reducing cell by means of a mechanical reducing arrangement.

In order to increase the range of performance, the hysteresis coupling means preferably has an adjustment means enabling the clearance and thus the value of the torque transmitted to be modified.

The flange connecting the motor and coupling means may equally contain at least one aperture, enabling the coupling means to be cooled by ventilation from the motor.

A complementary reducing cell coaxial with a motor-coupling group preferably comprises a member equipped with an internally toothed crown wheel, meshing with at least one planet wheel with two sets of teeth, the planet wheel itself meshing with the pinion of the output shaft of the motor-coupling group, each set of teeth of the planet wheel being adapted to engage optionally either the crown wheel or the pinion of the shaft, so as to provide two different reduction ratios.

The output shaft of the basic reducing mechanism may, for example, be driven by a toothed wheel carried by that shaft and selectively engaging at least one pinion carried by the output shaft of a motor-coupling group.

In a special embodiment the pinions of the basic reducing mechanism are bevel pinions and the holes are arranged radially in the casing, so as to enable the motor-coupling groups and complementary reducing cells to be mounted in a star-shape. In this case the casing advantageously has two base plates at right angles, allowing it to be fixed on a support optionally in one of two perpendicular planes.

The kinematic chain according to the invention is particularly well adapted to driving the reel of a cable winder, associated e.g. with a raising or handling device. In this case the output shaft of the reducing mechanism is hollow to give passage to the cable and enable a collector to be fitted.

Figure 3:
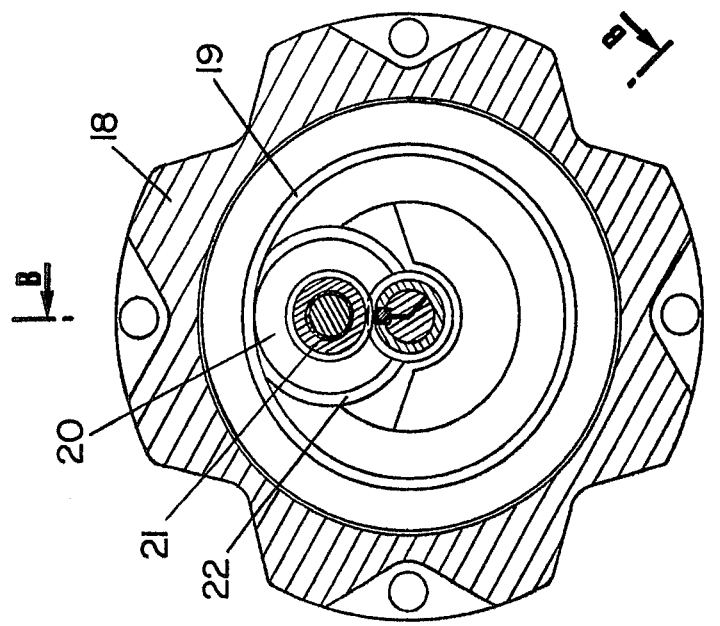
Figure 2:
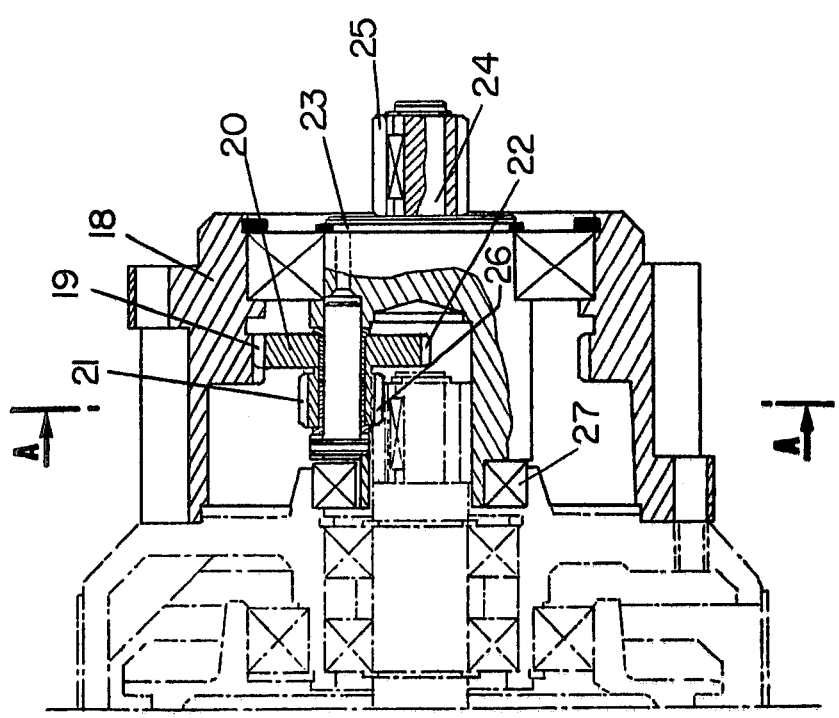
Figure 4:
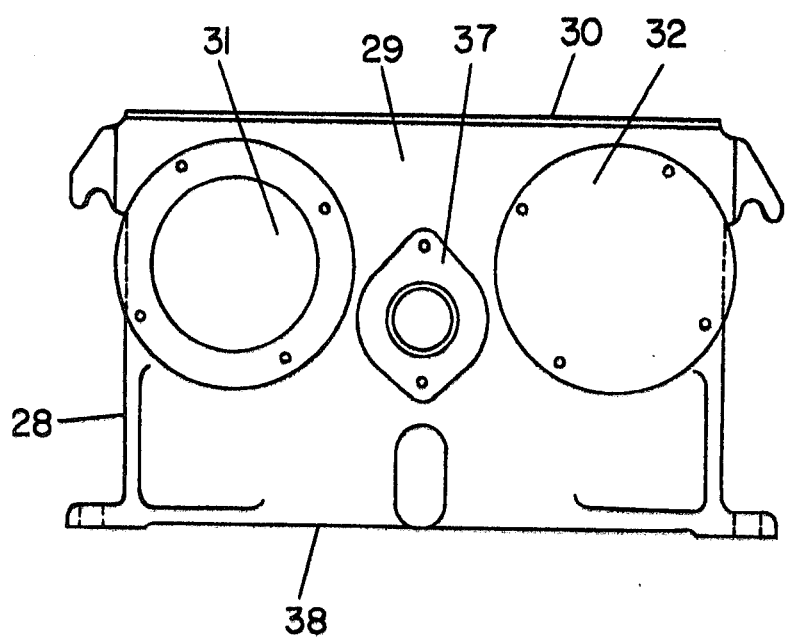
Figure 5:
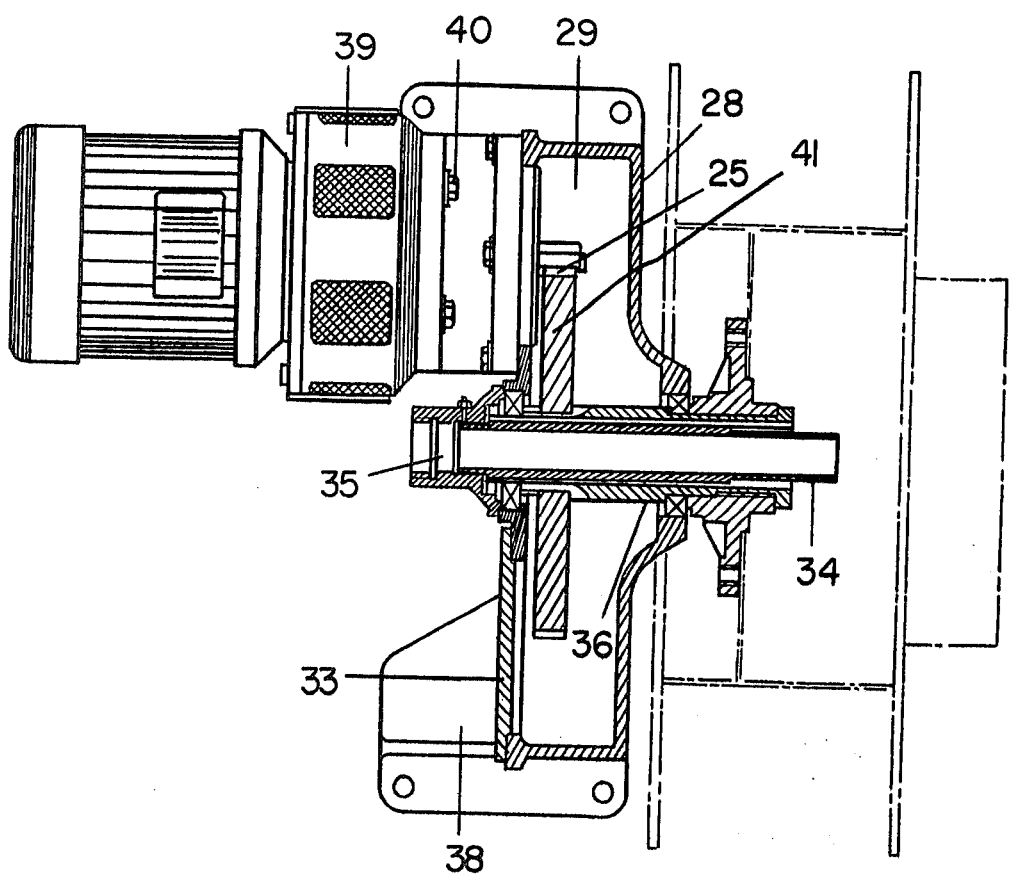
Figure 6:
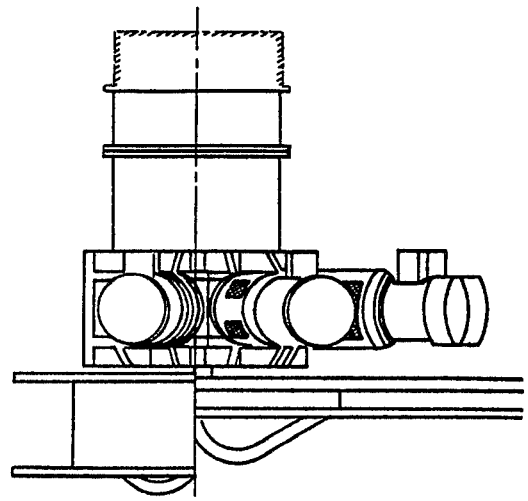
Figure 7:
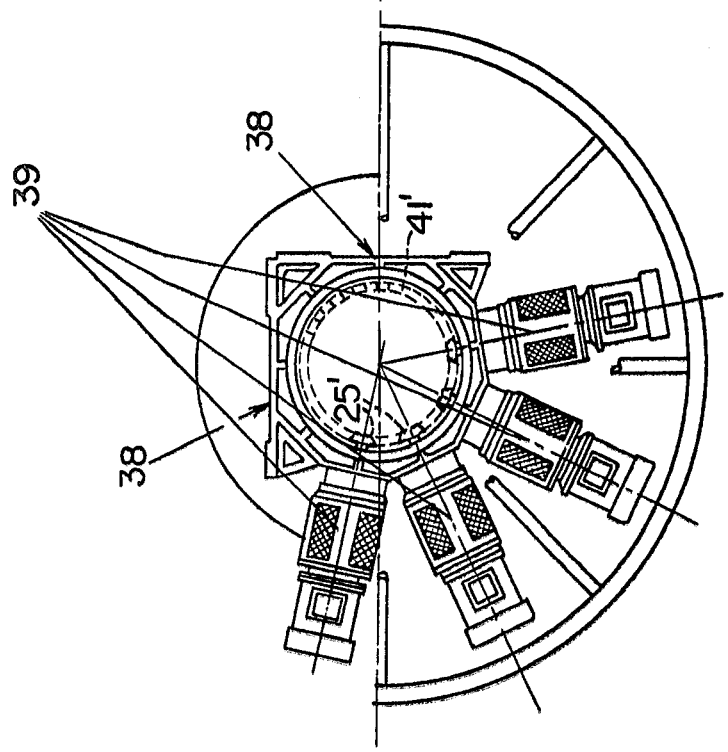

The invention will be better understood on referring to the accompanying drawings, which show only special, non-restrictive embodiments. In these:

FIG. 1 is a section, taken in a plane passing through the axis of revolution, through a motor-coupling group forming part of the kinematic chain according to the invention, FIGS. 2 and 3 are sections, taken in planes B—B and A—A respectively, through a reducng cell coaxial with a motor-coupling group, FIGS. 4 and 5 are respectively a front elevation and a transverse section through the basic reducing mechanism on which the other components are mounted, and FIGS. 6 and 7 are respectively a side and a front elevation of a star-shaped assembly of motor-coupling groups equipped with reducing cells, mounted on the basic reducing mechanism, for driving a cable winder.

The motor-coupling group as shown in FIG. 1 comprises a commercial three-phase asynchronous motor 1 without any special peculiarity. This is fixed on a flange cheek 2 providing the main support for a bell-shaped casing 3 which itself supports the coupling unit. Flange cheek 2 also makes it possible to mount an anti-turnback ring 4 designed to prevent reverse rotation of the shaft. Ring 4 is held laterally in position by a cap 5 and angularly by a pin 6, and the whole arrangement is made water-tight. In this position ring 4 is better protected than at the rear of the motor and moreover it does not impose any burden on the standard nature of the motor.

Flange cheek 2 contains one or more apertures 7 which enable the ventilation from the motor to be picked up and utilized to bring fresh air onto the fins of the case of the coupling means, while eliminating the skin effect. A hub 9 is fixed to the end of drive shaft 8. This acts as a coupling element for driving the primary part of the coupling means, through coupling studs 10 made of a heat-resistant material.

The coupling means proper is a magnetic coupler with hysteresis, made up of two coaxial components adapted to rotate relative to one another.

The primary 11 contains an inductor with permanent magnets which develops an alternate multi-polar field, and the secondary 12 comprises an induced element made of hard ferro-magnetic material but not previously magnetized.

The clearance of the coupling means is adjusted by means of a threaded ring 13. Rotation of the ring causes secondary 12 to be translated along main output shaft 14 of the motor-coupling group, and such rotation is locked by an indexing and blocking screw 15. Adjustment is carried out with the motor and blocking screw removed, by means of a key for rotating the ring; this changes the clearance of the coupling means and thus the nominal value of the torque transmitted.

The coupling means is placed in a sealed case 16 to isolate it from the external atmosphere which may be polluted. The case has fins 17 to accelerate dissipation of the heat produced when there is a great deal of slip.

The use of such a motor-coupling group with hysteresis makes it possible to transmit greater torques at higher angular speeds than e.g. a torque motor with the same space requirement and the same weight. Thus a motor-coupling group with hysteresis, working continuously, can transmit a torque of 0.7 mkg at a velocity of 1500 rpm, i.e. a power of 1000 W, whereas a torque motor with an identical space requirement transmits on setting 0.4 mkg at 300 rpm 0.35 mkg (maximum power 100 W) and reaches zero torque at 500 rpm.

The complementary reducing cell shown in FIGS. 2 and 3 comprises a member 18 acting as a casing. This holds an internally toothed crown wheel 19 in its lateral and angular position. Crown wheel 19 meshes with one or more planet wheels 20 which have two sets of teeth, one small 21 and one large 22. Planet wheels 20 are mounted on a planet wheel carrier 23 comprising a removable supporting cheek. The cheek receives the planet wheel or wheels and a shafted portion 24 on which the driving pinion 25 of the basic reducing mechanism is mounted.

Each planet wheel may be mounted in two ways. The first way (not illustrated) is for the set 22 containing the larger number of teeth on the planet wheel to be driven by the output pinion 26 carried by the output shaft 14 of the motor-coupling group, and for the set 21 containing the smaller number of teeth to engage with crown wheel 18. But the direction of mounting may equally be reversed. In the illustrated embodiment, the set 22 engages the crown wheel and set 21 engages pinion 26 of the output shaft of the motor-coupling group, thus enabling a different reduction ratio although the same planet wheel carrier is used. Each planet wheel 20 is mounted on a self-lubricating ring.

It is equally possible to use a planet wheel with one set of teeth, giving a mean reduction, in an intermediate position, and to retain the same receiving elements.

The design of the assembly enables shaft 24 to be immediately centered. A bearing 27, the inner ring of which is rigidly connected to the shaft, is housed in a hole provided in the outlet of the pillow-block bearing of the motor coupling.

The basic reducing mechanism shown in FIGS. 4 and 5 is in accordance with that described in French Pat. No. 1,518,964. It comprises a casing consisting of a cast metal component which forms an internal chamber 29 closed at the top by a cover 30. One surface of the casing contains two holes 31 and 32 which may selectively receive either a motor-coupling group, which may or may not be equipped with a complementary reducing cell fixed by its flange, or simply a closure 33, if one of the two holes is not used and if the output shaft 34 of the reducing mechanism is driven from one motor component.

The casing also contains coaxial apertures 35 and 36 in its opposite walls for mounting the output shaft 34 by means of ball bearings. A recessed cap 37 seals the aperture 35 opposite that through which output shaft 34 projects from the casing. The casing 28, which has a base-plate 38 fixed to an appropriate support, acts as a holder both for the driving motor-coupling groups and for the driven component, and may interact with the stationary components to absorb the reaction torque.

In the assembly shown in FIG. 5 the output shaft is driven by one motor-coupling group 39 with a complementary coaxial reducing cell 40 added to it, the cell being mounted on hole 21 by a flange. Hole 32 is closed by closure 33. Output shaft 24 of the unit comprising the motor-coupling group and reducing cell has a pinion 25 at its end portion. Pinion 25 meshes with a toothed wheel 41 mounted on the output shaft 34 which rotates the component. It is of course advisable to provide sealing means at the outlet of the reducing mechanism for shaft 34.

The component which is rotated may e.g. be the reel of a cable winder, possibly associated with a raising device. In this case shaft 34 is hollow and may receive a shaft of collectors coaxially.

In cases where a plurality of motor-coupling groups are mounted on the reducing mechanism these have parallel intakes as in the FIG. 5 lay-out, that is to say, the output shafts 24 of the motor-couplings are parallel. Assembly is described as "surface assembly", in the sense that holes 31 and 32 in the casing of the basic reducing mechanism are located in a surface of the casing.

It is equally possible to provide an assembly with angular intakes or a star-shaped assembly, with the holes located in the casing in different planes, causing output shafts 24 to subtend a certain angle. The design is the same as for surface assembly except that the pinions 25' are bevel instead of straight ones as is the toothed wheel 41'. FIGS. 6 and 7 give an example of this type of assembly with four inlets, although the number of inlets may of course be greater or less.

Casing 28 then has the feature of having two baseplates 38 at right angles, enabling the reducing mechanism to be turned to find the best adaptation to available clearances.

The fact that only a small number of mechanical parts standardized to a maximum is used either in the basic reducing mechanism, limited to one reduction state, or in the complementary cells makes it possible, under acceptable economic conditions, for these components to be subjected to a surface treatment such as high-temperature carbonitrosulfurization. With the use of an appropriate lubricant, this removes the burden of periodic maintenance which was necessary in prior art assemblies.

The invention is also illustrated by the following example.

EXAMPLE

A kinematic chain according to the invention, comprising a basic reducing mechanism with a reduction ratio of 15 per bevel pinion and five inlets in a star arrangement, is used to drive a cable winder with a total over-hanging charge of 5,000 kg on the reel.

Each motor-coupling group makes it possible to have a torque of 0.7 mkg of the narrowest clearance (0.8 mm) when running continuously. Adjustment of the clearance enables the torque to be reduced to 0.35 mkg at a clearance of 3.5 mm.

Depending on the number of motor-coupling groups mounted and the cells used, the ten following torque values (in mkg) are obtained at the outlet, with the motor-coupling groups set to the maximum.

| NUMBER OF MOTOR-COUPLING GROUPS | REDUCING CELL | |
|---|---|---|
| | r = 4.77 | r = 9.81 |
| 1 | 47 | 93 |
| 2 | 94 | 186 |
| 3 | 141 | 279 |
| 4 | 188 | 372 |
| 5 | 235 | 465 |

By adjusting the clearances of the motor-coupling goups all values between maximum torque and half that torque can be obtained. Since the various ranges overlap there is a possibility of obtaining all torque values from 10 to 465 mkg while using only standardized components.

We claim:

1. A modular kinematic chain for transmitting a torque, with slip and speed reduction, to a member which is rotated, characterized in that it comprises; at least one motor-coupling group consisting of a standard motor, a hysteresis coupling means with permanent magnets, and an output shaft, at least one complementary reducing cell coaxial with the output shaft of a motor-coupling group and having an output shaft drivingly engaged with the motor-coupling group output shaft, and a basic convertible reducing mechanism including a casing containing an aperture, an output shaft for passage through said aperture, and at least two holes for selectively receiving a motor-coupling group, and associated complementary reducing cell, the output shaft of the reducing mechanism being driven by the output shaft of the reducing cell by means of a mechanical reducing arrangement.

2. A chain according to claim 1, characterized in that the hysteresis coupling means comprise an adjustment means for changing the clearance.

3. A chain according to claim 2, characterized in that the motor-coupling group comprises an anti-turnback device.

4. A chain according to 3, comprising a flange connecting the motor and coupling means, said flange containing at least one aperture enabling the coupling means to be cooled by ventilation from the motor.

5. A chain according to claim 4, characterized in that each complementary reducing cell coaxial with a motor-coupling group comprises a member equipped with an internally toothed crown wheel meshing with at least one planet wheel with two sets of teeth, the planet wheel itself meshing with a pinion on the output shaft of the motor-coupling group.

6. A chain according to claim 5, wherein the output shaft of the basic reducing mechanism is driven by a toothed wheel carried by that shaft and selectively engaging at least one pinion carried by the output shaft of a complementary reducing cell, characterized in that the pinions are bevel-geared, and that the holes are arranged radially in the casing so as to enable mounting of motor-coupling groups in a star-shape.

7. A chain according to claim 6, characterized in that the casing of the basic reducing mechanism has two base plates at right angles, enabling it to be fixed selectively on a support in two perpendicular planes.

8. A chain according to claim 1, characterized in that each complementary reducing cell coaxial with a motor-coupling group comprises a member equipped with an internally toothed crown wheel meshing with at least one planet wheel with two sets of teeth, the planet wheel itself meshing with a pinion on the output shaft of the motor-coupling group.

9. A chain according to claim 1, wherein the output shaft of the basic reducing mechanism is driven by a toothed wheel carried by that shaft and selectively engaging at least one pinion carried by the output shaft of a complementary reducing cell, characterized in that the pinions are bevel-geared, and that the holes are arranged radially in the casing so as to enable mounting of motor-coupling groups in a star-shape.

10. A modular kinematic chain for transmitting a torque, with slip and speed reduction, to a member which is rotated, characterized in that it comprises; at least one motor-coupling group consisting of a standard motor, hysteresis coupling means with permanent magnets, and an output shaft, and a basic convertible reducing mechanism including a casing containing an aperture, an output shaft for passage through said aperture, and at least two holes for selectively receiving a motor-coupling group, the output shaft of the reducing mechanism being driven by the output shaft of the motor-coupling group by a mechanical reducing arrangement.

* * * * *